(12) United States Patent
Reuberger (10) Patent No.: US 11,502,500 B2
(45) Date of Patent: Nov. 15, 2022

(54) METHOD FOR SWITCHING OFF AN ARC IN AN ELECTRICAL INSTALLATION

(71) Applicant: Eaton Intelligent Power Limited, Dublin (IE)

(72) Inventor: Georg Reuberger, Schweiggers (AT)

(73) Assignee: Eaton Intelligent Power Limited, Dublin (IE)

( * ) Notice: Subject to any disclaimer, the term of this patent is extended or adjusted under 35 U.S.C. 154(b) by 195 days.

(21) Appl. No.: 16/467,505

(22) PCT Filed: Dec. 1, 2017

(86) PCT No.: PCT/EP2017/081245
§ 371 (c)(1),
(2) Date: Jun. 7, 2019

(87) PCT Pub. No.: WO2018/104181
PCT Pub. Date: Jun. 14, 2018

(65) Prior Publication Data
US 2020/0076181 A1    Mar. 5, 2020

(30) Foreign Application Priority Data
Dec. 9, 2016 (DE) ..................... 10 2016 123 953.4

(51) Int. Cl.
| | | |
|---|---|---|
| *H02H 1/00* | (2006.01) | |
| *H02B 1/30* | (2006.01) | |
| *H02B 13/025* | (2006.01) | |
| *H02H 5/12* | (2006.01) | |
| *H01H 83/14* | (2006.01) | |
| *H02H 3/08* | (2006.01) | |

(Continued)

(52) U.S. Cl.
CPC ........... *H02H 1/0023* (2013.01); *H02B 1/306* (2013.01); *H02B 13/025* (2013.01); *G01V 3/08* (2013.01);

(Continued)

(58) Field of Classification Search
CPC .......... H02H 1/0023; H02H 3/08; H02H 5/12; H02B 1/306; H02B 13/025; H01H 83/14; H01H 83/20; H01H 9/50; G01V 3/08

(Continued)

(56) References Cited

U.S. PATENT DOCUMENTS 5,382,896 A * 1/1995 Schueller ................ H01F 38/30
324/126
6,141,192 A * 10/2000 Garzon .................. H01H 33/26
361/5

(Continued)

FOREIGN PATENT DOCUMENTS

| DE | 202012001729 U1 | 4/2012 |
|---|---|---|
| DE | 102013001612 A1 | 8/2013 |

(Continued)

*Primary Examiner* — Thienvu V Tran
*Assistant Examiner* — Sreeya Sreevatsa
(74) *Attorney, Agent, or Firm* — Leydig, Voit & Mayer, Ltd.

(57) ABSTRACT

An electrical installation includes: a switchgear cabinet; a protective switch arranged in the switchgear cabinet; at least one optical triggering device which is operatively connected to the protective switch and for triggering or switching off the protective switch upon optical detection of an arc; a detection device for detecting an access or an access request to a secured area of the electrical installation by detecting a presence of the at least one optical triggering device in a danger area of the electrical installation; and an electronic circuit which is connected to the detection device and allows, and otherwise prevents, a triggering or switching off of the protective switch by the at least one optical triggering device upon detection of the access or the access request, when the at least one optical triggering device is present in the danger area.

20 Claims, 5 Drawing Sheets

(51) Int. Cl.
*G01V 3/08* (2006.01)
*H01H 83/20* (2006.01)
(52) U.S. Cl.
CPC .............. *H01H 83/14* (2013.01); *H01H 83/20* (2013.01); *H02H 3/08* (2013.01); *H02H 5/12* (2013.01)
(58) Field of Classification Search
USPC ............................................................. 361/2
See application file for complete search history.

(56) References Cited

U.S. PATENT DOCUMENTS

| | | | |
|---|---|---|---|
| 2005/0264427 A1* | 12/2005 | Zeng ........................ | H02H 5/12 340/635 |
| 2009/0124881 A1* | 5/2009 | Rytky ....................... | A61B 5/25 600/372 |
| 2010/0133922 A1* | 6/2010 | Payack .................... | H02H 5/12 307/328 |
| 2010/0214724 A1* | 8/2010 | Dahl ..................... | H02H 1/0023 361/621 |
| 2013/0063871 A1 | 3/2013 | Weiher et al. | |
| 2014/0043714 A1* | 2/2014 | Benke ..................... | H02H 3/10 361/42 |
| 2014/0071569 A1 | 3/2014 | Liptak et al. | |
| 2017/0263097 A1* | 9/2017 | Song ........................ | G08B 21/02 |
| 2019/0340909 A1* | 11/2019 | Nguyen .................. | G08B 21/02 |

FOREIGN PATENT DOCUMENTS

| | | | |
|---|---|---|---|
| EP | 2424059 A2 | 2/2012 | |
| EP | 2696460 A1 | 2/2014 | |
| EP | 3005520 A2 * | 4/2016 | ................ H02J 3/36 |

* cited by examiner

METHOD FOR SWITCHING OFF AN ARC IN AN ELECTRICAL INSTALLATION

CROSS-REFERENCE TO PRIOR APPLICATIONS

This application is a U.S. National Phase application under 35 U.S.C. § 371 of International Application No. PCT/EP2017/081245, filed on Dec. 1, 2017, and claims benefit to German Patent Application No. DE 10 2016 123 953.4, filed on Dec. 9, 2016. The International Application was published in German on Jun. 14, 2018 as WO 2018/104181 under PCT Article 21(2).

FIELD

The invention relates to an electrical installation, comprising a switchgear cabinet, a protective switch arranged in the switchgear cabinet, and at least one optical triggering device which is operatively connected to the protective switch and designed to trigger or switch off the protective switch upon detection of an arc. The invention further relates to a method for securing an electrical installation and operating personnel located in or at the electrical installation, wherein the electrical installation comprises a switchgear cabinet, a protective switch arranged in the switchgear cabinet, and at least one optical triggering device which is operatively connected to the protective switch and triggers or switches off the protective switch upon detection of an arc.

BACKGROUND

Such a method and such a device are known in principle and are used, for example, to protect people and/or the installation itself from the destructive effects of an arc caused by a short circuit, or at least to lessen its effects. For example, animals or also a falling tool as well as (damp) dirt can reduce the insulation or the spark gap between two conductors with different voltage potentials such that such an arc is generated. Due to the sometimes very high resulting currents, violent explosions can occur due to the quickly heated air.

Therefore, electrical installations are frequently monitored for the occurrence of such an accidental arc, which in many cases is achieved by measuring the current flowing through the electrical conductors and detecting the emitted light emanating from the arc. If both criteria are met, an alarm signal or a switching signal can be output for closing a low-impedance connection between said conductors with different voltage potentials, particularly from a switch between these conductors. As a result, the arc is rapidly extinguished, but very high currents occur in the supply lines, which trigger a higher-level overcurrent switch, which ultimately disconnects the vulnerable point from the network. Of course, said switching signal can also be used directly to open a switch or a plurality of switches in the supply lines to the arc.

As a rule, the optical triggering devices for switching off or triggering a protective switch in the switchgear cabinet are permanently installed and monitor sensitive areas therein. For example, the light emanating from a monitoring area can be guided via optical fibers to the optical triggering device.

Mobile optical triggering devices for switching off or triggering a protective switch are also known. As a rule, these are used temporarily and can also be arranged outside of the switchgear cabinet. In particular, such an optical triggering device can be worn by a person as protection. If the optical triggering device worn by the person detects an arc, the protective switch is switched off or triggered and protects the person from the effects of the arc. In this manner, for example, electrical installations or switchgear cabinets, which otherwise have no protection against the occurrence of an arc, can also be protected, or areas of electrical installations or switchgear cabinets, which otherwise have no protection against the occurrence of an arc, can be protected.

The problem is that the optical triggering device arranged outside of the switchgear cabinet is usually located in an environment that is difficult to assess. For example, events other than an arc can cause a false triggering of the protective switch, such as bright flashes of light, which are not inherently hazardous.

One example is a flash of a photo camera, with which a picture of the electrical installation is taken, as well as flickering lamps and the like. In addition, arcs can also occur in electrical installations during normal operation, for example, in the form of switching arcs, when a live switching contact is disconnected. The switching arc can be visible directly and/or glowing gas can emerge from the switching device, which originates from the burning switching contacts or arc deflectors or arc extinguishing plates of the switching device.

If the person looks in the direction of the respective flash of light, or if the mobile optical triggering device is aligned towards it, the switching device coupled with or operatively connected to the optical triggering device is switched off/triggered, regardless whether the flash of light poses a potential danger and whether the switching device associated with the optical triggering device can at all influence, i.e., extinguish, the flash of light.

Under certain circumstances, such harmless triggers lead to serious consequences, for example, if the electrical installation supplies safety-critical consumers which are switched off unnecessarily. Examples are medical equipment, computer servers, technical installations with unstable processes, and the like.

SUMMARY

In an embodiment, the present invention provides an electrical installation, comprising: a switchgear cabinet; a protective switch arranged in the switchgear cabinet; at least one optical triggering device which is operatively connected to the protective switch and configured to trigger or switch off the protective switch upon optical detection of an arc; a detection device configured to detect an access to a secured area of the electrical installation by detecting a presence of the at least one optical triggering device in a danger area of the electrical installation; and an electronic circuit which is connected to the detection device and is configured to allow, and otherwise prevent, a triggering or switching off of the protective switch by the at least one optical triggering device when the at least one optical triggering device is present in the danger area.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved electrical installation and an improved method for operating such an installation. In particular, a dangerous arc may be detected safely, and an unnecessary shutdown of an electrical installation may be avoided.

In an embodiment, the present invention provides a device of the initially described type, further comprising
  a detection device for detecting an access or an access request to a secured area of the electrical installation, and
  an electronic circuit which is connected to the detection device and allows, and otherwise prevents, a triggering or switching off of the protective switch by the at least one optical triggering device upon detection of an access or an access request.

In an embodiment, the present invention provides a method of the initially described type, in which the protective switch is triggered or switched off by the at least one optical triggering device only if an access or an access request to a secured area of the electrical installation is detected.

In this manner, it is prevented that the optical triggering device triggers a protective switch in a secured area, from which no danger originates or in which no endangered person is located. As a rule, electrical installations also have passive protection, for example, in the form of covers, housings, enclosures, and cabinets. If an (accidental) arc occurs in such a secured area, there is generally no serious danger to a person outside of said area, even if the arc is not or not immediately switched off. By the measures proposed above, it is thus ensured that the optical triggering device triggers a protective switch in a secured area only if the occurring arc actually represents a danger to someone. For example, a switching arc within a closed switchgear cabinet or at a sufficient distance is harmless in itself, but if the head of the person is located, for example, in the immediate vicinity of the arc, it can result in serious health consequences. The visual detection of an arc as such is inherently known and can be based, for example, on the intensity and/or the spectral distribution of the light received.

In particular, the electrical installation can be designed such that
  the protective switch has a switching input for triggering or switching off the protective switch,
  the at least one optical triggering device has a control output which is (operatively) connected to the switching input of the protective switch, and
  the at least one optical triggering device is designed to change the state of the control output upon detection of an arc and to subsequently trigger or switch off the protective switch.

The electrical installation thus comprises
  a switchgear cabinet,
  a protective switch arranged in the switchgear cabinet, said protective switch having a switching input for triggering or switching off the protective switch, and
  at least one optical triggering device for detecting an arc, wherein
  the at least one optical triggering device has a control output which is connected to the switching input of the protective switch,
  the at least one optical triggering device is designed to change the state of the control output upon detection of an arc and to subsequently trigger or switch off the protective switch, and
  wherein
  the electrical installation comprises a detection device for detecting an access or an access request to a secured area of the electrical installation, and
  an electronic circuit which is connected to the detection device and allows, and otherwise prevents, a triggering or switching off of the protective switch by the at least one optical triggering device upon detection of an access or an access request.

Accordingly, a method for securing an electrical installation is advantageous, which comprises a switchgear cabinet, and a protective switch arranged in the switchgear cabinet, said protective switch having a switching input for triggering or switching off the protective switch, and at least one optical triggering device for detecting an arc
  wherein
  the at least one optical triggering device of the electrical installation detects a light emitted in the electrical installation (particularly in the switchgear cabinet),
  the at least one optical triggering device changes a state of the control output of the at least one optical triggering device, when the occurrence of the (accidental) arc is detected, and
  the control output, which is connected to the switching input of the protective switch, triggers or switches off the protective switch upon detection of an (accidental) arc, and wherein
  a detection device of the electrical installation detects an access or an access request to a secured area of the electrical installation, and
  an electronic circuit, which is connected to the detection device, allows, and otherwise prevents, a triggering or switching off of the protective switch by the at least one optical triggering device upon detection of an access or an access request.

For the sake of completeness, it must be noted that the term "access" within the scope of the invention is synonymous with the term "entry." In other words, walking is possible but, strictly speaking, not necessary for accessing a secured area of the electrical installation.

Advantageously, e) the at least one optical triggering device can be designed to be attached to the human body, or f) the at least one optical triggering device is arranged in the switchgear cabinet or outside on the switchgear cabinet, or g) a first optical triggering device is designed to be attached to the human body, and a second optical triggering device is arranged in the switchgear cabinet or outside on the switchgear cabinet.

In cases e) and g), the at least one (first) optical triggering device can be arranged particularly on a helmet, an armband and/or on an article of clothing, particularly on a jacket. The optical triggering device can be arranged, for example, permanently on the helmet, the armband and/or the article of clothing, or, if necessary, it can be attached temporarily to the aforementioned objects, for example, with a clip or a Velcro strip. In case f), the (second) optical triggering device can also comprise a clip or, for example, a magnet, with which the optical triggering device can be fastened to metallic components.

It is advantageous if the electronic circuit is designed or acts as a logical AND operation of a positive arc signal of the optical triggering device and an access signal of the detection device, and is operatively connected to the protective switch on the output side. The AND operation is thus logically inserted between the protective switch and the optical triggering device. Accordingly, a positive arc signal of the optical triggering device and an access signal of the detection device are logically ANDed, and the protective switch is only switched off or triggered by the optical triggering device, when an access or access request to the electrical installation is detected.

In addition, it is advantageous if a) the detection device is designed to detect a closed state of a switchgear cabinet door and/or an access door to the electrical installation, particularly as a switching contact, and the electronic circuit connected to the detection device is designed to allow a triggering or switching off of the protective switch by the at least one optical triggering device in the OPEN state of the switchgear cabinet door/access door, and to prevent said triggering or switching off in the CLOSED state of the switchgear cabinet door/access door, and/or b) the detection device is designed as a manually operable access switch to the switchgear cabinet and/or the electrical installation, and the electronic circuit connected to the detection device is designed to allow, and otherwise prevent, a triggering or switching off of the protective switch by the at least one optical triggering device in case of an actuated access switch, and/or c) the detection device for detecting the presence of the optical triggering device is formed in a danger area of the electrical installation, and the electronic circuit connected to the detection device is designed to allow, and otherwise prevent, a triggering or switching off of the protective switch by the at least one optical triggering device in case of an optical triggering device present in the danger area.

In case a), access or entry is detected in that a door to the electrical installation or a switchgear cabinet door is opened. In particular, the door to the electrical installation or the switchgear cabinet door is equipped with a switching contact. Alternatively or additionally, a manually operable access switch can be provided, the switching state of which is evaluated in order to allow or prevent a triggering or switching off of the protective switch by the at least one optical triggering device (case b). For example, the access switch can be coupled with a lock that closes a door to the electrical installation or a switchgear cabinet door. If the access switch is actuated, the lock opens and the optical triggering device is also released. In other words, a switching off of the protective switch by the at least one optical triggering device is made possible. As a further alternative or additional option, it can be provided that the presence of the optical triggering device in a defined danger area is verified. If the optical triggering device is in the danger area, a switching off of the protective switch by the at least one optical triggering device is basically possible. If the optical triggering device is outside the danger area, this is not possible.

It is particularly advantageous in connection with the above-mentioned case c) if the detection device is designed as a wireless detection receiver or connected to a wireless detection receiver and is designed to detect the optical triggering device as present in a danger area, when a transmit signal produced by the optical triggering device generates a reception field strength in the detection receiver, which lies above a field strength threshold value. Accordingly, the protective switch is switched off or triggered by the optical triggering device only when the optical triggering device is detected as present in a danger area, i.e., when a transmit signal produced by the optical triggering device generates a reception field strength in the detection receiver, which lies above a field strength threshold value. The danger area, in which the optical triggering device must be located in order to be able to trigger the protective switch, does not necessarily have to coincide with the reception area of a wireless receiver which is coupled with the switching input of the protective switch. It is necessary for a correct function that the mentioned reception area of the receiver coupled with the protective switch covers the danger area, but it can also go beyond it.

It is further advantageous if the electrical installation
has an operating current measuring device for measuring a current flowing through the protective switch or through the electrical installation, and
an electronic circuit which is connected to the operating current measuring device and allows a triggering or switching off of the protective switch by the optical triggering device only when an operating current threshold value is exceeded by the measured operating current and/or an increase threshold value of a time derivative of the measured operating current is exceeded.

Accordingly, it is advantageous if the protective switch is triggered or switched off by the at least one optical triggering device only when a measured current flowing through the protective switch or the electrical installation exceeds an operating current threshold value and/or the time derivative of the measured operating current exceeds an increase threshold value.

In this variation of the electrical installation, a second criterion is thus used to classify an event as an arc. Specifically, not only the light emanating from the arc is evaluated (namely by the optical triggering device), but also the current flowing through a protective switch or through the electrical installation. For example, a photo flash can thus not cause a switching off of the protective switch since this is not accompanied by a current increase through the electrical installation. The probability of a false triggering is thus significantly reduced.

It is further advantageous if the protective switch is designed as a line protective switch, as an arc short-circuit switch or as a combined line and arc short-circuit switch. These switches are frequently already present in an electrical installation for other purposes and are also used by the proposed system, resulting in a double benefit. "Line protective switches" are generally used to disconnect an electric circuit, when an overload is detected. An overload is usually present in case of an overcurrent, particularly in connection with a specific current increase, and/or an overtemperature, i.e., in case of a thermal overload. "Arc short-circuit switches" are used to short-circuit two or more conductors with different voltage potentials (for example, the phases and possibly a neutral) to extinguish a burning arc. As a rule, arc short-circuit switches are used in combination with an upstream line protective switch, thus creating a switch cascade. If the arc short-circuit switch is closed, the occurring short-circuit currents are usually so high that they result in a switching off or triggering of the line protective switch. The two switches can generally also be designed as a combined line and arc short-circuit switch. The aforementioned switch cascade can be effective, or in case of danger, the two switches can also be actuated simultaneously. An operative connection to the optical triggering device can now be applied to a line protective switch and directly switch off/trigger said line protective switch, or the operative connection can also be applied to the arc short-circuit switch and close it in case of danger. The arc thus "simulated" results in turn in the triggering of an upstream line protective switch if it is not already switched simultaneously with the arc short-circuit switch (e.g., if a combined line and arc short-circuit switch is used). The optical triggering device can thus be operatively connected to an accidental arc protection system.

It is advantageous if the operative connection between the protective switch and the optical triggering device is made wireless or by wire. In particular, it can be provided that
the control output of the optical triggering device is designed as a wireless transmitter or is connected to a wireless transmitter,
the switching input of the protective switch is designed as a wireless receiver or is connected to a wireless receiver, and
the wireless transmitter and the wireless receiver are designed to establish a wireless (operative) connection.

The wireless version provides particularly great comfort for the person present in an electrical installation because, due to the wireless operative connection, said person can move freely in the secured area. For this purpose, both radio connections and optical operative connections are possible. In principle, it is also possible that the control output of the optical triggering device is (operatively) connected electrically or by wire to the switching input of the protective switch. This variation somewhat restricts the freedom of movement of the person present in the secured area, but it is particularly safe (from interferences).

It is also particularly advantageous if
the electrical installation comprises g) two measuring electrodes with a voltage measuring device arranged in between for measuring the voltage applied between the measuring electrodes, and/or h) two measuring electrodes with a current measuring device arranged in between for measuring the current flowing between the measuring electrodes, and/or i) an article of clothing with electrical conductors and a current measuring device for measuring the current flowing through said electrical conductors,
the voltage measuring device/current measuring device is operatively connected to the protective switch, and
the voltage measuring device/current measuring device is designed to trigger or switch off the protective switch upon detection of a measured value lying above a threshold value.

Accordingly, it is also advantageous if
g) a voltage measuring device of the electrical installation arranged between two measuring electrodes and operatively connected to the protective switch determines the voltage lying between the measuring electrodes, and/or h)
a current measuring device of the electrical installation arranged between two measuring electrodes and operatively connected to the protective switch determines the current flowing between the measuring electrodes, and/or
i) a current measuring device of the electrical installation operatively connected to the protective switch determines the current flowing through the electrical conductors of an article of clothing, and
the voltage measuring device/current measuring device triggers or switches off the protective switch, when a measured value lying above a threshold value is detected.

In particular, the electrical installation can be designed such that
the protective switch has a switching input for triggering or switching off the protective switch,
the voltage measuring device/current measuring device has a control output which is (operatively) connected to the switching input of the protective switch, and
the voltage measuring device/current measuring device is designed to change the state of the control output upon detection of a measured value lying above a threshold value and to subsequently trigger or switch off the protective switch.

Danger to a person cannot only emanate from an (accidental) arc occurring in the electrical installation, but also, for example, from an excessively high fault current via a faulty insulation. The measures proposed above protect a person not only from an arc but also from the detrimental effects of an excessive fault current. Specifically, it can be ensured that the fault current used for the switching off or triggering of a protective switch does not constitute a health risk for a person located in or at the electrical installation. In particular, this switching off can be based on a different (particularly a lower) fault current than a fault current which is permitted during normal operation of the electrical installation without the presence of a person.

In case g), the fault current is determined by measuring the voltage lying between the measuring electrodes. The fault current flows over the person located in the electrical installation, for example, over the person's arm, and, due to the resistance of the human body (approximately 800 ohms), causes a voltage drop between the measuring electrodes. If the measured value, i.e., the measured voltage, exceeds a certain threshold value, which is associated with a hazard to humans by the corresponding fault current, the circuit, from which the danger emanates, is disconnected from a supply voltage.

In case h), the measuring electrodes are electrically connected to each other, preferably by means of an electrical conductor, whose resistance is lower than that of the human body. The fault current then flows at least between the two measuring electrodes mainly through the electrical conductor, whereby the person located in the electrical installation is spared.

The current measuring device can have a current measuring resistor electrically connected to the measuring electrodes, or also a push-through converter which optionally can also be designed as a current measuring clamp. In the former, the fault current is determined via the electric voltage drop at the current measuring resistor. In this case, the electrical installation thus basically has a voltage measuring device. The boundaries between voltage measuring device and current measuring device are therefore fluent. By contrast, with the push-through converter, an electromagnetic field is determined which is caused by the current flowing between the measuring electrodes. With this measuring method, the connection between the two measuring electrodes can be realized in a particularly low-impedance manner.

In case i), an article of clothing worn by the person located in the electrical installation has electrical conductors. For example, the article of clothing can be designed as a glove, jacket, overalls, pants, or protective suit, and the electrical conductors can be formed by electrically conductive wires, an electrically conductive mesh and/or by an electrically conductive foil, particularly by metallic wires, a metallic mesh and/or by a metallic foil or also by carbon wires, a carbon wire mesh and/or by a carbon foil. The electrical conductors are incorporated in the article of clothing and preferably do not touch the skin of the person located in the electrical installation. For example, a layer of cotton fabric or other electrically insulating material lies between the skin and the conductors. Although an insulation between the electrical conductors and the person is advantageous, the electrical conductors can nevertheless also bear against the skin of the person located in the electrical installation.

As in case h), the fault current flows mainly through the electrical conductors and only to a slight extent over the person located in the electrical installation, once again sparing said person. The current itself can once again be measured using a current measuring resistor connected to the electrical conductors of the article of clothing, or by means of a push-through converter which measures an electromagnetic field caused by a current flowing through the electrical conductors of the article of clothing.

The measures proposed for cases g) to i) can be applied to an electrical installation individually or in combination. It is particularly advantageous if cases g) and i) or cases h) and i) are combined. In general, persons located in an electrical installation are supposed to wear protective clothing which, as described in case i), can be equipped with electrical conductors. If the person touches conductive parts of the electrical installation, a fault current, as explained above, flows essentially over the electrical conductors of the protective clothing and only to a slight extent over the body of the person located in the electrical installation, sparing said person. However, contrary to the recommendations or also regulations of the operators of the electrical installations, the protective clothing is sometimes not worn. For example, protective gloves are taken off, when work has to be done that is difficult to do with gloves, such as adjustment tasks or the screwing in of screws. If the worker now touches electrical conductive parts of the electrical installation, the fault current cannot flow off the protective clothing (not worn), but flows over the body of the worker. The measures proposed in cases g) or h) now advantageously take effect, and as a result, the circuit, from which the danger emanates, is also switched off. The electrical installation is thus particularly safe.

Depending on whether a voltage measuring device or a current measuring device is used, the threshold value provided for triggering or switching off the protective switch is a voltage threshold value (if a voltage measuring device is used) or a current threshold value (if a current measuring device is used). Within the scope of the disclosure, the term "threshold value" is used in a simplified manner and, depending on the application, can be replaced by the term "voltage threshold value" or "current threshold value."

It is particularly advantageous if the voltage measuring device/current measuring device and the optical triggering device are operatively connected to the same protective switch. The advantage of the proposed measures becomes particularly apparent or results in a particularly synergistic benefit because a protective switch can be used for the prevention of danger of two different incidents. In addition, it must be remembered that the protective switch, as mentioned above, is frequently already present in an electrical installation and, for example, switches off in case of an overcurrent (line protective switch).

In principle, the optical triggering device could also be operatively connected to a protective switch other than the voltage measuring device/current measuring device. In particular, options are once again line protective switches, arc short-circuit switches, or combined line and arc short-circuit switches. It is also conceivable that the voltage measuring device/current measuring device is operatively connected to a first group of protective switches, and the optical triggering device is operatively connected to a second group of protective switches. The two groups can particularly also have an intersection.

It is advantageous if the measuring electrodes in cases g) and h) are designed to be attached to the human body, particularly to the skin of the human body. Accordingly, the measuring electrodes for executing the disclosed method are attached to the human body, particularly to the skin of the human body, and in case g), the voltage dropping between the measuring electrodes on said body is determined, or in case h), the current flowing between the measuring electrodes is determined. If a person (inadvertently) touches parts of the electrical installation which carry a dangerous voltage, an electric current flows over the human body, and particularly over the touching arm, which causes a voltage drop between the measuring electrodes due to the resistance of the human body (approximately 800 ohms). If the measured value (i.e., the measured voltage or the measured current) exceeds a specific threshold value, which is associated with a danger to the person due to the corresponding fault current, the circuit, from which the danger originates, is disconnected from a supply voltage, as described above.

It is particularly advantageous if one electrode is arranged on each armband/leg band, or if both measuring electrodes are arranged at a distance from each other on a single armband/leg band. The former offers the advantage of better mobility, the latter leads to a known spacing of the electrodes on the human body. Of course, the electrical installation can also have a plurality of electrode pairs, and so, for example, a worker can be equipped with a plurality of measuring electrodes, or multiple workers can be equipped with measuring electrodes.

In order to ensure that no dangerous voltage potentials can develop on said human body, it is advantageous if one of the two measuring electrodes in cases g) and h) is connected to a ground potential, or said human body is connected to a ground potential by means of a ground electrode, and/or in case i), the electrical conductors of the article of clothing are connected to a ground potential. Accordingly, it is also advantageous if one of the two measuring electrodes in cases g) and h) is connected to a ground potential, or if the electrical installation has a ground electrode connected to a ground potential, said ground electrode being designed to be attached to the human body, particularly to the skin of the human body, and/or in case i), the electrical conductors of the article of clothing are connected to a ground potential. Specifically, the ground electrode can once again be arranged on an armband or a leg band.

It is generally advantageous if the measuring electrodes and/or the ground electrode are arranged on the inside of an article of clothing, particularly on a jacket, pants, a shoe and/or on a glove. In this manner, both the worker and the measuring electrodes are well protected. In the area of the measuring electrodes and/or the ground electrode, tensioning straps can be attached on the outside of the corresponding article of clothing, and so the measuring electrodes and/or the ground electrode can be pressed firmly onto the skin of the human body. In this manner, a type of armband or leg band is once again created. The measuring electrodes, the bands, the electrical conductors, as well as the voltage measuring device and the current measuring device can particularly be part of the same article of clothing.

Finally, it is advantageous if the switchgear cabinet is designed for an operating current of at least 250 amperes and/or for an operating voltage of maximally 1000 VAC or 1500 VDC. These ranges characterize high-current installations or low-voltage installations. The proposed arrangement is particularly well suited for this type of electrical installations.

At this point, it must be noted that the variations disclosed with regard to the electrical installation and the resulting advantages similarly relate to the operating method for the electrical installation, and vice versa.

Figure 1:
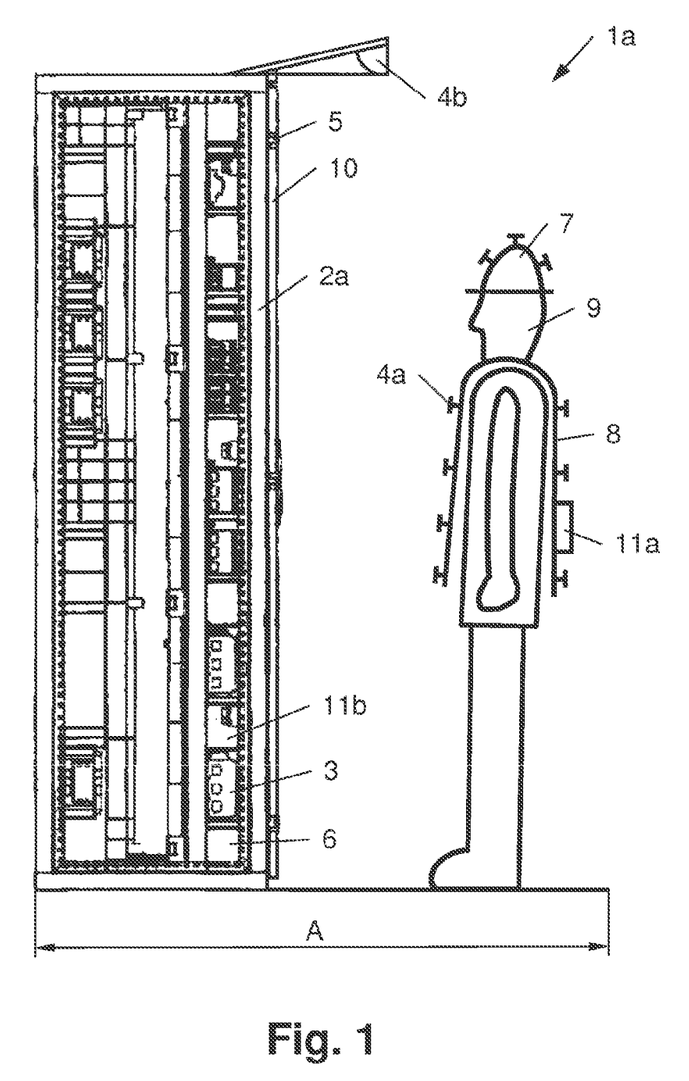
FIG. 1 shows a schematic depiction of an exemplary electrical installation with optical triggering devices which are operatively connected to a protective switch.

FIG. 1 shows an electrical installation 1*a*, comprising a switchgear cabinet 2*a* and a protective switch 3 arranged in the switchgear cabinet 2*a*. The switchgear cabinet 2*a* can be designed particularly for an operating current of at least 250 amperes and/or for an operating voltage of maximally 1000 VAC or 1500 VDC. The electrical installation 1*a* further comprises a plurality of optical triggering devices 4*a*, 4*b* which are operatively connected to the protective switch 3 and designed to trigger or switch off the protective switch 3 upon detection of an arc.

In addition, the electrical installation 1*a* has a detection device 5 for detecting an access or an access request to a secured area of the electrical installation 1*a*, and an electronic circuit 6 which is connected to the detection device 5 and allows, and otherwise prevents, a triggering or switching off of the protective switch 3 by the optical triggering devices 4*a*, 4*b* upon detection of an access or an access request.

For that purpose, the protective switch 3 can have a switching input for triggering or switching off the protective switch 3. The optical triggering device 4*a*, 4*b* can have a control output which is (operatively) connected to the switching input of the protective switch 3. Upon detection of an arc, the optical triggering device 4*a*, 4*b* changes the state of the control output and subsequently triggers the protective switch 3.

In the present example, a plurality of first optical triggering devices 4*a* are designed to be attached to the human body, and a second optical triggering device 4*b* is arranged on the outside of the switchgear cabinet 2*a*. As shown in FIG. 1, the first optical triggering devices 4*a* can be arranged on a helmet 7, an armband and/or on an article of clothing 8 and be worn by a person 9. In the present example, a special protective vest 8 is provided as the article of clothing, but it is also conceivable that the first optical triggering devices 4*a* are arranged on a jacket or pants.

In the example shown in FIG. 1, the detection device 5 is designed to detect a closed state of a switchgear cabinet door 10, i.e., is specifically designed as a switching contact. In the example shown, the switchgear cabinet door 10 is fully open and can thus only be seen from its narrow side. The electronic circuit 6 connected to the detection device 5 is designed to allow a triggering or a switching off of the protective switch 3 by the optical triggering devices 4*a*, 4*b* in the OPEN state of the switchgear cabinet door 10, and to prevent said triggering or switching off in the CLOSED state of the switchgear cabinet door 10. In the present example, an access or entry to the switchgear cabinet 2*a* is thus detected in that the switchgear cabinet door 10 is opened.

The protective switch 3 is therefore only switched off or triggered by the optical triggering devices 4*a*, 4*b*, when the switchgear cabinet door 10 is open and an access or entry to the switchgear cabinet 2*a* is detected. Accordingly, a positive arc signal of the optical triggering devices 4*a*, 4*b* and an access signal of the detection device 5 are logically ANDed. The electronic circuit 6 operatively connected on the output side to the protective switch 3 can thus be designed as a logical AND operation or at least act as such. The AND operation is thus logically inserted between the protective switch 3 and the optical triggering devices 4*a*, 4*b*.

The proposed measures ensure that the optical triggering devices 4*a*, 4*b* trigger the protective switch 3 only when there is actually a danger emanating from the secured area. In this example, there is a case of danger, when the switchgear cabinet door 10 is open, and passive measures (covers, housings, enclosures, or the housing of the switchgear cabinet 2*a* as such) are thus not effective, or only to a limited extent, in protecting against the effects of an accidental arc. However, if no danger emanates from the secured area (because the switchgear cabinet door 10 is closed), the optical triggering devices 4*a*, 4*b* cannot trigger the protective switch 3. It is thus prevented that safety-critical circuits are switched off because of a perceived emergency and without actual danger to the person 9.

In the example shown, the operative connection between the protective switch 3 and the optical triggering devices 4*a*, 4*b* is made wirelessly. For this purpose, the control output of the optical triggering devices 4*a* in this example is connected to a wireless transmitter 11*a*, and the switching input of the protective switch 3 is connected to a wireless receiver 11*b*. The wireless transmitter 11*a* and the wireless receiver 11*b* are designed to establish a wireless (operative) connection. In the example shown, a separate transmitter 11*a* and a separate receiver 11*b* are provided. Of course, it would also be conceivable for the transmitter(s) 11*a* to be integrated in the optical triggering devices 4*a* and/or for the receiver 11*b* to be integrated in the protective switch 3.

Although the wireless variation, which, for example, can be realized to be optical or radio-based, offers much comfort and freedom of movement for the person 9, it is basically also conceivable that the operative connection between the optical triggering devices 4*a*, 4*b* and the protective switch 3 is made by wire. For this purpose, the control output of the optical triggering devices 4*a*, 4*b* can be connected to the switching input of the protective switch 3 by means of a cable. This variation somewhat restricts the freedom of movement of the person 9 present in the secured area, but it is particularly safe (from interferences). Since the second optical triggering device 4b can be permanently attached to the switchgear cabinet 2a, the wired variation lends itself for connecting the triggering device 4b to the protective switch 3. As described above for the first optical triggering devices 4a, the triggering device 4b can nevertheless be connected wirelessly to the protective switch 3.

In the example shown in FIG. 1, a plurality of first optical triggering devices 4a is arranged to be distributed all over the person 9, and a second optical triggering device 4b is arranged on the outside of the switchgear cabinet 2a and aligned toward the interior of the switchgear cabinet 2a. It would also be conceivable that the second triggering device 4b is arranged inside the switchgear cabinet 2a, or also that a plurality of second triggering devices 4b are provided. It is similarly conceivable that only one first optical triggering device 4a is provided, attached, for example, to the helmet 7 and aligned particularly in the line of vision of the person 9. Of course, the system can also be designed for more than one person 9. By providing first and second optical triggering devices 4a and 4b, the person 9 is in any case very well protected from an occurring arc.

Nevertheless, it is conceivable that only first optical triggering devices 4a are arranged on the person 9 (and a second optical triggering device 4b on or in the switchgear cabinet 2a is omitted), or that only at least one second optical triggering device 4b is arranged on or in the switchgear cabinet 2a (and a first optical triggering device 4a on the person 9 is omitted). As a result, the system has a simpler design and functions in the manner already described above.

In the example shown in FIG. 1, the detection device 5 detects the closed state of the switchgear cabinet door 10. However, it is also conceivable that the detection device 5 alternatively or additionally detects the closed state of an access door to the electrical installation 1a (not depicted).

It is also conceivable that the detection device 5 is designed as a manually operable access switch to the switchgear cabinet 2a and/or to the electrical installation 1a, and the electronic circuit 6 connected to the detection device 5 is designed, at actuated access switch, to allow, and otherwise prevent, a triggering or switching off of the protective switch 3 by the optical triggering devices 4a, 4b. Such an access switch can be designed, for example, as a key switch and arranged at the entrance to the electrical installation 1a. The access switch can also be coupled with a lock which closes a door to the electrical installation 1a or a switchgear cabinet door 10. If the access switch is actuated, the lock opens and the optical triggering devices 4a, 4b are also released, which allows a switching off of the protective switch 3 by the optical triggering devices 4a, 4b.

As a further alternative or additional option, it can be provided that the detection device 5 is designed to detect the presence of the optical triggering devices 4a, 4b in a danger area A of the electrical installation 1a, and the electronic circuit 6 connected to the detection device 5 allows, and otherwise prevents, a triggering or switching off of the protective switch 3 by the optical triggering devices 4a, 4b, when the optical triggering devices 4a, 4b are present in the danger area A.

For this purpose, the detection device 5 can be designed as a wireless detection receiver or be connected to a wireless detection receiver. In particular, the detection device 5 can be connected to or realized by the wireless receiver 11b.

The optical triggering devices 4a, 4b are subsequently detected as being present in a danger area A if a transmit signal produced by the optical triggering devices 4a, 4b generates a reception field strength in the detection receiver which lies above a field strength threshold value. The danger area A, in which the optical triggering devices 4a, 4b must be located in order to be able to trigger the protective switch 3, does not necessarily have to coincide with the reception area of the wireless receiver 11b which is coupled with the switching input of the protective switch 3. It is necessary for a correct function that the mentioned reception area of the receiver 11b coupled with the protective switch covers the danger area, but it can also go beyond it.

The protective switch 3 can be designed as a line protective switch, as an arc short-circuit switch or as a combined line and arc short-circuit switch. These switches are frequently already present in an electrical installation 1a for other purposes and are also used by the proposed system, resulting in a double benefit.

Figure 2:
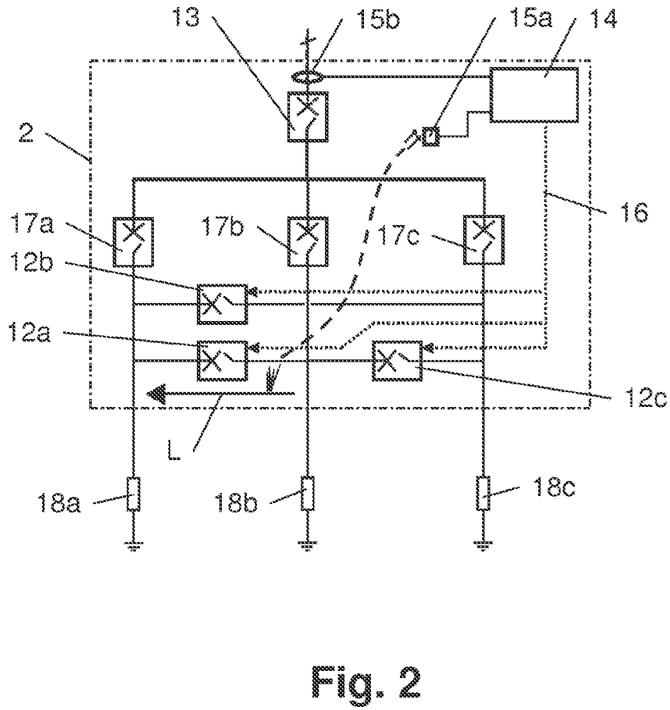
FIG. 2 shows an exemplary switching cascade with a plurality of arc short-circuit switches and higher-level line protective switches.

Thereto, FIG. 2 shows the operating principle of a switching cascade, which has a plurality of arc short-circuit switches 12a . . . 12c and a higher-level line protective switch 13. FIG. 2 further shows the purely symbolically depicted, exemplary switchgear cabinet 2 with a device 14 for detecting an arc, which is connected to a photosensitive element 15a and a current measuring loop 15b or a push-through converter 15b. In addition, said device 14 has a switching output 16.

In addition to the higher-level line protective switch 13, optional line protective switches 17a . . . 17c, each associated with one phase of a three-phase system, are provided. Finally, three consumers 18a . . . 18c are also connected to the switchgear cabinet 2.

The mode of operation of the switching cascade shall now be explained using the example of an accidental arc L burning between two phases:

By means of the photosensitive element 15a, a monitoring area is monitored for the occurrence of an arc L. If an arc L is detected, a switching signal is output via the output 16, which is guided to the inputs of the arc short-circuit switches 12a . . . 12c. As a result of the switching signal, the arc short-circuit switches 12a . . . 12c are closed and thus extinguish the arc L burning between the phases. The overcurrent caused by the short circuit subsequently triggers the higher-level line protective switch 13 or the line protective switches 17a . . . 17c, thus ultimately disconnecting the affected circuit from the electrical grid.

Of course, it is also conceivable that the line protective switch 13 and/or the line protective switches 17a . . . 17c are not triggered by the overcurrent but directly by the signal at the output 16, which is then also guided to the inputs of the line protective switch 13 and/or the line protective switches 17a . . . 17c.

In the present case, not only the signal of the photosensitive member 15a but also the current measured by the current measuring loop 15b is used to decide whether or not an arc L is present. According to this method, an arc L is present, when bright light is measured by the photosensitive member 15a, AND when the operating current measured by the current measuring loop 15b exceeds an operating current threshold value. The current measuring loop 15b thus acts as an operating current measuring device 15b. Of course, additional or other criteria can also be used to determine whether an arc L is present or not.

The optical triggering devices 4a, 4b of FIG. 1 can now be directly operatively connected to and control the line protective switch 13/the line protective switches 17a . . . 17c. However, the optical triggering devices 4a, 4b can also be operatively connected to and control the arc short-circuit switches 12a . . . 12c, provided that arc-short circuit switches 12a . . . 12c are installed in the switchgear cabinet 2a. In such case, the line protective switches 13, 17a . . . 17c can be triggered indirectly by the cascade effect described above, or the line protective switches 13, 17a . . . 17c are also controlled directly by the optical triggering devices 4a, 4b. The optical triggering devices 4a, 4b can thus be operatively connected to an accidental arc protection system.

An arc can also be detected purely visually in the electrical installation 1a according to FIG. 1, or an operating current measuring device 15b is provided for measuring a current flowing through the protective switch 3, 13, 17a . . . 17b or through the electrical installation 1a, and an electronic circuit 14 is provided which is connected to the operating current measuring device 15b and allows a triggering or switching off of the protective switch 3, 13, 17a . . . 17b by the optical triggering device 4a, 4b only when an operating current threshold value is exceeded by the measured current and/or when an increase threshold value of a time derivative of the measured current is exceeded.

In the example shown, both a higher-level line protective switch 13 and line protective switches 17a . . . 17c, which are each associated with one phase of a three-phase system, are provided. For the same or a comparable function of the arrangement, it is also possible to only provide the higher-level line protective switch 13 or to only provide the line protective switches 17a . . . 17c which are each associated with one phase of a three-phase system.

Figure 3:
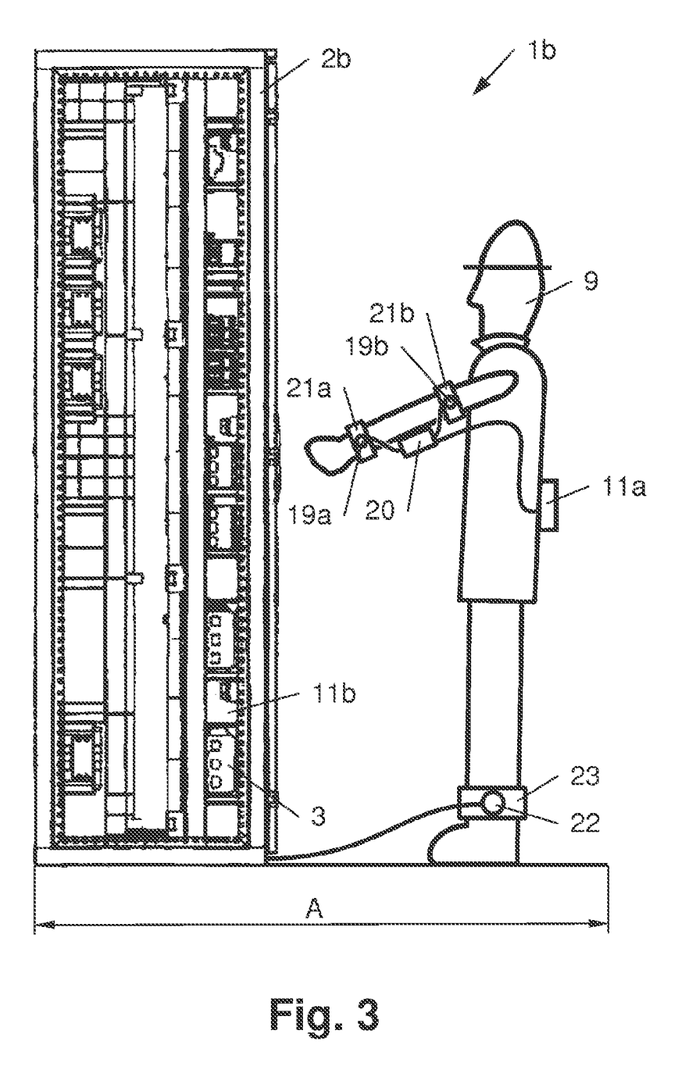
FIG. 3 shows a schematic depiction of an exemplary electrical installation with a voltage measuring device which is operatively connected to a protective switch.

FIG. 3 shows a further example of an electrical installation 1b which comprises a switchgear cabinet 2b and a protective switch 3 arranged in the switchgear cabinet 2b. The switchgear cabinet 2b can once again be designed for an operating current of at least 250 amperes and/or for an operating voltage of maximally 1000 VAC or 1500 VDC. Furthermore, the electrical installation 1b has two measuring electrodes 19a and 19b with a voltage measuring device 20 arranged in between for measuring the voltage lying between the measuring electrodes 19a, 19b. The voltage measuring device 20 is operatively connected to the protective switch 3 and designed to trigger or switch off the protective switch 3 upon detection of an overvoltage exceeding a threshold value (case g).

For that purpose, the protective switch 3 can have a switching input for triggering or switching off the protective switch 3. The voltage measuring device 20 can have a control output which is (operatively) connected to the switching input of the protective switch 3. Upon detection of an overvoltage exceeding a threshold value, the measuring device 20 changes the state of the control output and subsequently triggers the protective switch 3.

The two measuring electrodes 19a, 19b are designed to be attached to the human body, particularly to the skin of the human body. Specifically, the first measuring electrode 19a is arranged on a first armband 21a, and the second measuring electrode 21b is arranged on a second armband 21b, which are both worn by the person 9. In principle, both measuring electrodes 19a, 19b could also be arranged at a distance from one another on a single armband. Alternatively, the measuring electrodes 19a, 19b could also be arranged on one leg band or a plurality of leg bands. Two separate bands 19a, 19b offer the advantage of better mobility, whereas a single band has the advantage that the electrode spacing is predetermined and thus known.

In order to ensure that no dangerous voltage potentials can occur on the person 9, it is advantageous if, as shown in FIG. 3, it is connected to a ground potential by means of a ground electrode 22. The ground electrode 22 is once again designed to be attached to the human body, particularly to the skin of the human body, and in the case specifically shown, it is arranged on a leg band 23. Alternatively, the ground electrode 22 could also be arranged on an armband, particularly on the same armband 21a, 21b as the measuring electrode(s) 19a, 19b.

In general, it would also be conceivable that the measuring electrodes 19a, 19b and/or the ground electrode 22 are arranged on the inside of an article of clothing, particularly on a jacket, pants, a shoe and/or on a glove. In this manner, the worker 9 as well as the measuring electrodes 19a, 19b and the ground electrode 22 are well protected. In the area of the measuring electrodes 19a, 19b and/or the ground electrode 20, tensioning straps can be attached on the outside of the respective article of clothing, and so the measuring electrodes 19a, 19b and/or the ground electrode 22 can be pressed firmly onto the skin of the human body. In this manner, a type of armband or leg band is once again created.

In the depicted example, the operative connection between the protective switch 3 and the voltage measuring device 20 is made wirelessly. For this purpose, the control output of the voltage measuring device 20 is connected to a wireless transmitter 11a, and the switching input of the protective switch 3 is connected to a wireless receiver 11b. The wireless transmitter 11a and the wireless receiver 11b are designed to establish a wireless (operative) connection. In the depicted example, a separate transmitter 11a and a separate receiver 11a are provided. Of course, it would also be conceivable that the transmitter 11a is integrated in the voltage measuring device 20 and/or the receiver 11b is integrated in the protective switch 3.

Although the wireless variation which, for example, can be realized optically or radio-based, offers much comfort and freedom of movement for the person 9, it is basically also conceivable that the operative connection between the voltage measuring device 20 and the protective switch 3 is made by wire. For this purpose, the control output of the voltage measuring device 20 can be connected to the switching input of the protective switch 3 by means of a cable. This variation somewhat restricts the freedom of movement of the person 9 present in the secured area, but it is particularly safe (from interferences).

For executing the operating method, the voltage drop between the measuring electrodes 19a, 19b is now determined. If the person 9 (inadvertently) touches parts of the electrical installation 1b, which carry a dangerous voltage, an electric current flows over the person 9, and particularly over the touching arm, which causes a voltage drop between the measuring electrodes 19a, 19b due to the resistance of the human body (approximately 800 ohms). If the measured voltage or the fault current associated with said voltage exceeds a specific threshold value, which constitutes a danger to the person 9, the circuit from which the danger emanates, is disconnected from a supply voltage by the protective switch 3.

Figure 4:
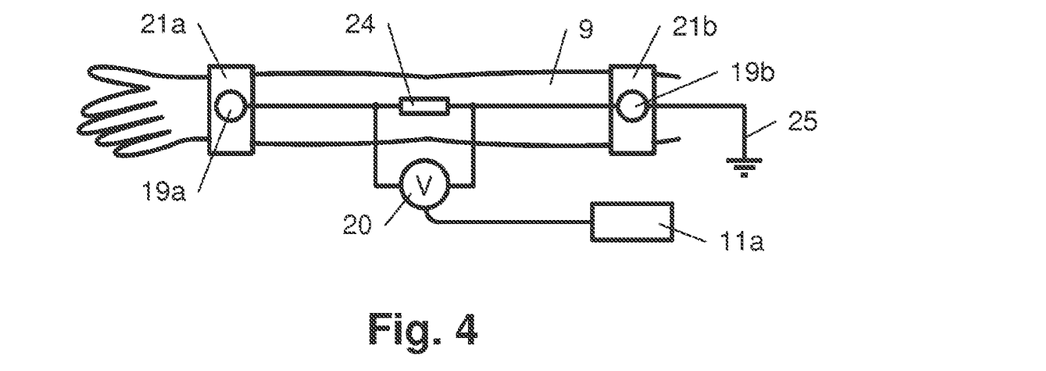
FIG. 4 shows a variation, in which the measuring electrodes are electrically connected to each other by a current measuring resistor.

FIG. 4 shows a variation, in which the measuring electrodes 19a, 19b are electrically connected to one another, specifically by a current measuring resistor 24 (case h). The fault current is determined via the voltage drop at the current measuring resistor 24, said voltage being measured with the voltage measuring device 20. The voltage measuring device 20 is once again connected to the wireless transmitter 11a and thus operatively connected to the protective switch 3. Preferably, the electrical resistance of the current measuring resistor 24 is lower than that of the human body. The fault current then flows at least between the two measuring electrodes 19a, 19b, mainly through the current measuring resistor 24 and only to a slight extent through the arm of the person 9 located in the electrical installation 1b. In the example shown in FIG. 4, the second measuring electrode 19b is connected directly to a ground potential 25, and so no dangerous voltage potentials can develop on the person 9. Of course, it is also conceivable that a ground electrode 22 is used instead, as shown in FIG. 3.

Figure 5:
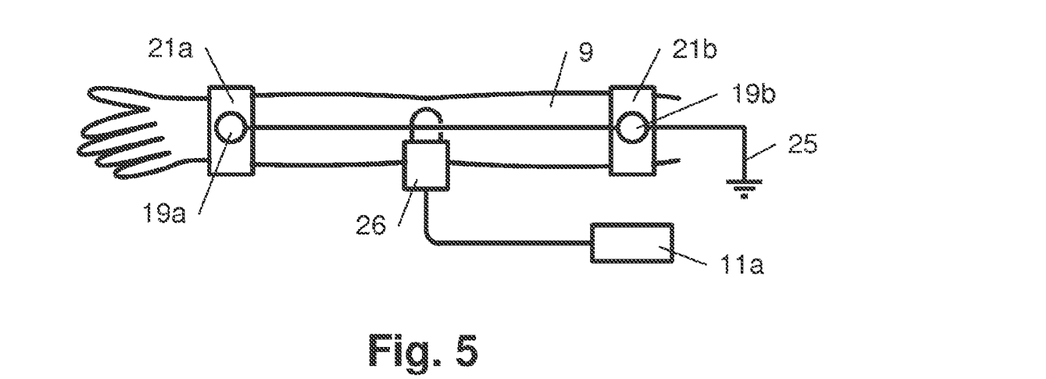
FIG. 5 shows a variation, in which the measuring electrodes are electrically connected to each other, and the current flowing between the measuring electrodes is determined with a push-through converter.

FIG. 5 shows a further example of case h), which is very similar to the example shown in FIG. 2. In contrast, however, no current measuring resistor 24 is used, but the two measuring electrodes 19a, 19b are connected directly to an electrical conductor. In addition, the voltage measuring device 20 is also omitted, and instead a push-through converter 26 is used, which measures an electromagnetic field generated by the current flowing between the measuring electrodes 19a, 19b. If the measured fault current exceeds a specific threshold value, which constitutes a threat to the person 9, the circuit, from which the danger emanates, is once again disconnected from a supply voltage by the protective switch 3. With this measuring method, the connection between the two measuring electrodes 19a, 19b can be realized in a particularly low-impedance manner, and hardly any current flows over the arm of the person 9 located in the electrical installation 1b.

Figure 6:
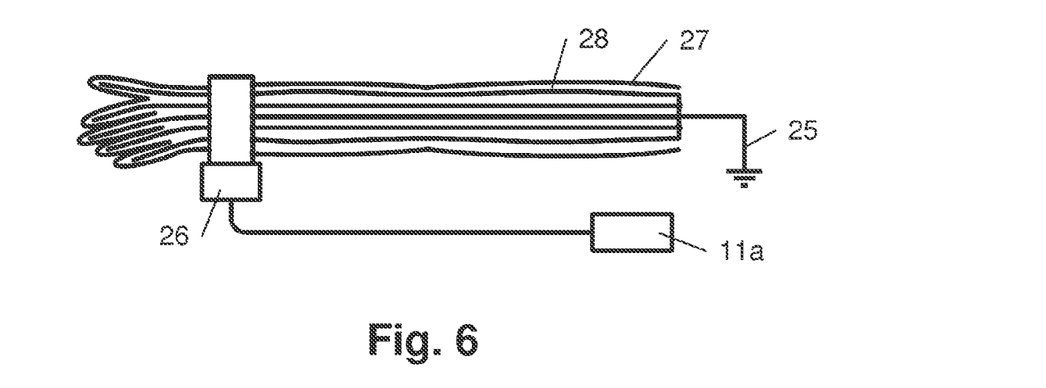
FIG. 6 shows an example of an article of clothing with electrical conductors and a push-through converter for determining the current flowing over said conductors.
Figure 9:
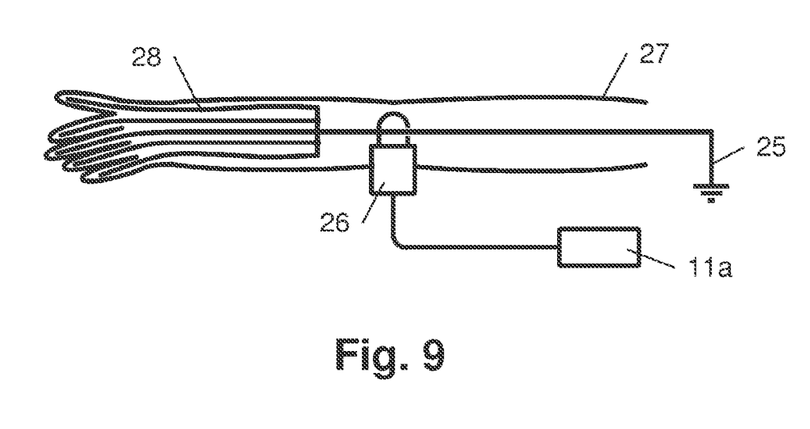
FIG. 9 shows a further example of an article of clothing with electrical conductors and a push-through converter for determining the current flowing over said conductors.

FIG. 6 shows an example of an article of clothing 27 which has electrical conductors 28 and is worn by the person 9 located in the electrical installation 1b (case i). FIG. 9 therefore does not directly show the arm of the person 9 but instead the article of clothing 27 covering the arm. In the concrete case, the article of clothing 27 is designed as a long glove, but a combination of a short glove with the sleeve of a jacket could also be provided. Generally, the article of clothing 27 can be designed, for example, as a glove, jacket, overalls, pants, shoe, or protective suit.

In this case, the electrical conductors 28 are formed by electrically conductive wires extending along the arm. For example, the wires 28 can be metallic, designed as carbon wires, or, for example, also be made of a conductive plastic. The wires 28 are incorporated into the article of clothing 27 and preferably do not touch the skin of the person 9 located in the electrical installation 1b. For example, a layer of cotton fabric or other electrically insulating material lies between the skin and the wires 28. Although an insulation between the wires 28 and the person 9 is advantageous, the wires 28 can nonetheless also bear against the skin of the person 9 located in the electrical installation 1b.

The fault current is measured by means of a push-through converter 26 which is exemplarily arranged in the area of the wrist and once again measures the electromagnetic field generated by a current flowing through the wires 28 of the article of clothing 27. Since the electrical resistance of the wires 28 is preferably significantly lower than the resistance of the human body, the fault current flows essentially over the wires 28 and only to a very limited extent over the arm of the person 9, who is thus protected particularly well against the effects of a fault current. In this example, the wires 28 are once again connected to a ground potential 25, and so no dangerous voltage potentials can develop on the person 9.

Figure 7:
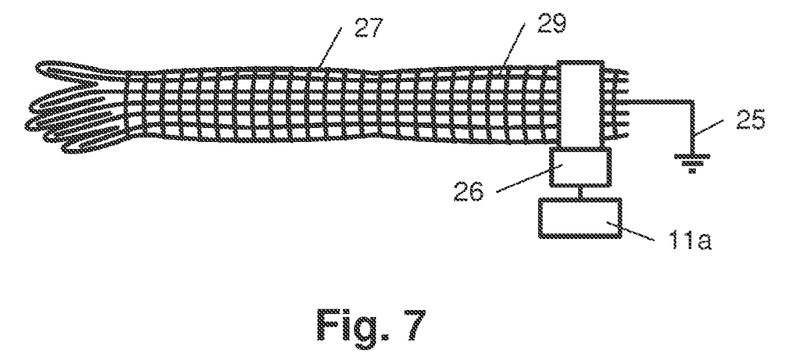
FIG. 7 shows an example of an article of clothing with electrical conductors and a push-through converter for determining the current flowing over said conductors as in FIG. 6, only with an electrically conductive mesh.

FIG. 7 shows a further example of case i) which is very similar to the example shown in FIG. 6. In contrast, however, an electrically conductive mesh 29 is incorporated in the article of clothing 27 which once again can consist of metal, carbon, or a conductive plastic. The push-through converter 26 is arranged by way of example in the area of the upper arm, which also allows for the detection of fault currents, when the person 9 bumps with the elbow into conductive parts of the electrical installation 1b. However, in the example shown in FIG. 7, the push-through converter 26 can naturally also be arranged in the area of the wrist, and in the example shown in FIG. 6, the push-through converter 26 can be arranged in the area of the shoulder. Due to the mesh 29, the fault current is advantageously better distributed to the longitudinal wires. Instead of or in addition to the mesh 29, or also in addition to the wires 28 of the example shown in FIG. 6, an electrically conductive foil can for the same purpose be incorporated into the article of clothing 27, and can once again be made of metal, carbon, or a conductive plastic.

Figure 8:
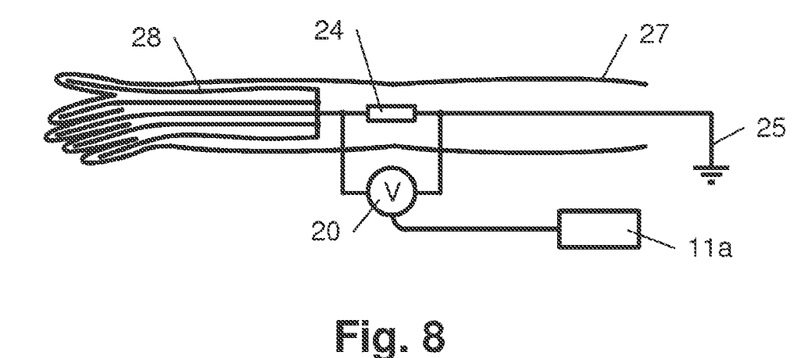
FIG. 8 shows an example of an article of clothing with electrical conductors and a current measuring resistor for determining the current flowing over said conductors.

FIG. 8 shows a further example of case i), in which the conductive wires 28 are connected to a current measuring resistor 24, which in turn is connected to a ground potential 25. The fault current is again determined by the electric voltage drop at the current measuring resistor 24, said voltage being measured by the voltage measuring device 20. Preferably, the electrical resistance of the current measuring resistor 24 is again lower than that of the human body, and so the fault current flows mainly through the current measuring resistor 24 and only to a slight extent through the arm of the person 9 located in the electrical installation 1b.

Finally, FIG. 9 shows an example of case i), in which the conductive wires 28 are connected to each other and directly connected to the ground potential 25. By means of the push-through converter 26, an electromagnetic field, which is generated by the current flowing toward the ground potential 25, is once again measured. With this measuring method, the connection to the ground potential 25 can be realized in a particularly low-impedance manner, and there is hardly any current flowing through the arm of the person 9 located in the electrical installation 1b.

The measures proposed for cases g) to i) can be applied individually or in combination in an electrical installation 1b. It is particularly advantageous if cases g) and i) or cases h) and i) are combined. In general, the persons 9 located in an electrical installation 1b are supposed to wear protective clothing which, as described in case i), is equipped with electrical conductors 28, 29. However, contrary to the recommendations or also regulations of the operators of the electrical installations 1b, the protective clothing 27 is sometimes not worn. For example, protective gloves 27 are taken off, when work has to be done that is difficult to do with the protective gloves 27, such as adjustment tasks or the screwing in of screws. If the worker 9 now touches electrical conductive parts of the electrical installation 1b, the fault current cannot flow off the protective gloves 27 (not worn), but flows over the body of the worker 9. The measures proposed in cases g) or h) (see FIGS. 3 to 5) now advantageously take effect, and as a result, the circuit, from which the danger emanates, is also switched off. The electrical installation 1b is thus particularly safe.

FIG. 3 only shows one person 9 with a pair of electrodes 19a, 19b and a ground electrode 22. Of course, the electrical installation 1b can also have a plurality of electrode pairs 19a, 19b and/or ground electrodes 22, and so, for example, a person 9 can be equipped with a plurality of electrode pairs 19a, 19b and/or ground electrodes 22, or several persons 9 can be equipped with electrode pairs 19a, 19b and/or ground electrodes 22. Similarly, the electrical installation 1b can comprise one or more of the protective equipment shown in FIGS. 4 to 9 for one or more persons 9, particularly also protective equipment of different design.

In general, the voltage measuring device 20/current measuring device 26 can be part of the article of clothing 27. For example, a push-through converter 26 can be incorporated into a glove.

In the examples shown in FIGS. 3 to 9, the fault current is measured on the arm of the person 9, particularly on the wrist of the person 9. The measurement can also be taken in the same manner on another part of the body, for example, on the leg or on the ankle of the person 9. In this case, the protective switch 3 is advantageously not only switched off/triggered, when the person 9 touches conductive parts of the electrical installation 1b with the fingers or the hand, but also, for example, when said parts are touched with the hip. It is advantageous in this context, when the fault current is diverted via the legs or feet of the person 9, which can be ensured particularly by connecting the legs or feet to the ground potential 25. For the reasons mentioned, it can also be advantageous if the entire protective clothing 27 of the person 9 is equipped with electrical conductors 28, 29.

The technical teaching disclosed for the detection device 5 for detecting the presence of the optical triggering devices 4a, 4b in a danger area A of the electrical installation 1a is analogously also applicable to the voltage measuring device 20/current measuring device 26 or the transmitter 11a. In other words, the electrical installation 1b can also be designed to detect the presence of the voltage measuring device 20/current measuring device 26 or the transmitter 11a by means of a detection receiver in a danger area A of the electrical installation 1b. Accordingly, the voltage measuring device 20/current measuring device 26 allows, and otherwise prevents, a triggering or switching off of the protective switch 3 if the voltage measuring device 20/current measuring device 26 or the transmitter 11a are present in the danger area A. The detection receiver can once again be formed by the receiver 11b.

The description for FIG. 1 and FIG. 2 applies to the type of protective switch 3 used. In other words, the protective switch 3 of FIG. 3 can once again be designed as a line protective switch 13, 17a . . . 17b, as an arc short-circuit switch 12a . . . 12b, or as a combined line and arc short-circuit switch (see FIG. 2).

The operative connection between the protective switch 3 and the voltage measuring device 20/current measuring device 26 can once again be wireless or wired, as has already been described above for the operative connection between the protective switch 3 and the optical triggering devices 4a, 4b.

By combining the system shown in FIG. 1 for preventing an arc with the system shown in FIGS. 3 to 9 for preventing a harmful fault current, the person 9 is particularly well protected. It must be noted at this point that, for reasons of better clarity, not all of the elements (particularly the triggering devices 4a) worn by the person 9 and explicitly depicted in FIG. 1 are also shown in FIGS. 3 to 9. In reality, however, these elements are present in a combination of the two systems described. These can be worn simultaneously, or one specific system is arranged on the person 9, if necessary.

The voltage measuring device 20/current measuring device 26 and the optical triggering devices 4a, 4b can particularly be operatively connected to the same protective switch 3. In this case, one and the same protective switch 3 is used for the hazard prevention of several different incidents, namely for the prevention of an arc L, which can be harmful to the person 9, for the prevention of a harmful fault current by the person 9, and of course also for the prevention of overcurrents (in case of a line protective switch), and also for the prevention of arcs L, when no person 9 is present (in case of an arc short-circuit switch).

In principle, however, the optical triggering devices 4a, 4b could also be operatively connected to a protective switch 3 other than the voltage measuring device 20/current measuring device 26. It is also conceivable that the voltage measuring device 20/current measuring device 26 is operatively connected to a first group of protective switches 3, and the optical triggering devices 4a, 4b are operatively connected to a second group of protective switches 3. The two groups can particularly also have an intersection.

Finally, it must be noted that the electrical installation 1a, 1b or its components are not necessarily shown to scale and therefore, they can also have different proportions. Furthermore, an electrical installation 1a, 1b can also comprise more or fewer components than are shown. Position specifications (e.g., "top," "bottom," "left," "right," etc.) refer to the respective drawing described and, in case of a change of position, must be adjusted analogously to the new position. Finally, it must be noted that the above embodiments and developments of the invention can be combined in any desired manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical installation, comprising:
a switchgear cabinet;
a protective switch arranged in the switchgear cabinet;
at least one optical triggering device which is operatively connected to the protective switch and configured to trigger or switch off the protective switch upon optical detection of an arc;
a detection device configured to detect an access to a secured area of the electrical installation by detecting a presence of the at least one optical triggering device in a danger area of the electrical installation;
an electronic circuit which is connected to the detection device and is configured to allow, and otherwise prevent, a triggering or switching off of the protective switch by the at least one optical triggering device when the at least one optical triggering device is present in the danger area;

an operating current measuring device configured to measure a current flowing through the protective switch or the electric installation; and a further electronic circuit which is connected to the operating current measuring device and is configured to trigger or switch off the protective switch by the at least one optical triggering device only when an operating current threshold value is exceeded by a measured operating current and when an increase threshold value of a time derivative of the measured operating current is exceeded, wherein:

the operative connection between the protective switch and the at least one optical triggering device and/or between the protective switch and the voltage measuring device/current measuring device is made wireless, the detection device is formed in the danger area of the electrical installation and the electronic circuit connected to the detection device is configured to allow, and otherwise prevent, a triggering or switching off of the protective switch by the at least one triggering device when the at least one optical triggering device is present in the danger area, and the detection device comprises a wireless detection receiver or is connected to a wireless detection receiver and configured to detect the at least one optical triggering device as present in a danger area, when a transmit signal generated by the at least one optical triggering device causes a reception field strength in the detection receiver which lies above a field strength threshold value.

2. The electrical installation according to claim 1, wherein the electronic circuit is configured as a logical AND operation of a positive arc signal of the at least one optical triggering device and an access signal of the detection device, and is operatively connected to the protective switch on an output side.

3. The electrical installation according to claim 1, wherein the protective switch has a switching input configured to trigger or switch off the protective switch, wherein the at least one optical triggering device has a control output which is connected to a switching input of the protective switch, and wherein the at least one optical triggering device is configured to change a state of the control output upon detection of an arc and to subsequently trigger or switch off the protective switch.

4. The electrical installation according to claim 1, wherein the protective switch comprises a line protective switch, an arc short-circuit switch, or a combined line and arc short-circuit switch.

5. The electrical installation according to claim 1, wherein d) the at least one optical triggering device is configured to be attached to a human body, or e) the at least one optical triggering device is arranged in the switchgear cabinet or outside the switchgear cabinet, or f) a first optical triggering device is configured to be attached to the human body, and a second optical triggering device is arranged in the switchgear cabinet or outside the switchgear cabinet.

6. The electrical installation according to claim 5, wherein the at least one optical triggering device is arranged on a helmet, an armband, and/or on an article of clothing.

7. The electrical installation according to claim 5, wherein the electrical installation comprises g) two measuring electrodes with a voltage measuring device arranged in between and configured to measure a voltage lying between the measuring electrodes, and/or h) two measuring electrodes with a current measuring device arranged in between configured to measure a current flowing between the measuring electrodes, and/or i) an article of clothing with electrical conductors and a current measuring device configured to measure a current flowing through the electrical conductors, wherein the voltage measuring device/current measuring device is operatively connected to the protective switch, and wherein the voltage measuring device/current measuring device is configured to trigger or switch off the protective switch upon detection of a measured value lying above a threshold value.

8. The electrical installation according to claim 7, wherein the measuring electrodes in cases g) and h) are configured to be attached to a human body.

9. The electrical installation according to claim 8, wherein one electrode is arranged on one armband/leg band each, or wherein both measuring electrodes are arranged at a distance from each other on a single armband/leg band.

10. The electrical installation according to claim 7, wherein the electrical installation in case h) has one current measuring resistor electrically connected to the measuring electrodes, and/or in case i) has a current measuring resistor connected to the electrical conductors of the article of clothing, and in both cases has a voltage measuring device configured to measure an electrical current drop at the current measuring resistor, and/or the current measuring device has a push-through converter configured to measure an electromagnetic field which in case h) is generated by a current flowing between the measuring electrodes, and in case i) is generated by a current flowing through the electrical conductors of the article of clothing.

11. The electrical installation according to claim 7, wherein in case i), the electrical conductors provided in the article of clothing comprise electrically conductive wires, an electrically conductive mesh, and/or an electrically conductive foil.

12. The electrical installation according to claim 7, wherein one of the two measuring electrodes in cases g) and h) is connected to a ground potential, or a ground electrode is provided which is connected to a ground potential and which is configured to be attached to the human body, and/or in case i), the electrical conductors of the article of clothing are connected to a ground potential.

13. The electrical installation according to claim 12, wherein the ground electrode is arranged on an armband or a leg band.

14. The electrical installation according to claim 7, wherein the measuring electrodes and/or the ground electrode are arranged inside an article of clothing.

15. The electrical installation according to claim 7, wherein the article of clothing comprises a glove, jacket, overalls, pants, or protective suit.

16. The electrical installation according to claim 1, wherein a control output of the at least one optical triggering device and/or the voltage measuring device/current-measuring device is configured as a wireless transmitter or is connected to a wireless transmitter, wherein a switching input of the protective switch is configured as a wireless receiver or is connected to a wireless receiver, and wherein the wireless transmitter and the wireless receiver are configured to establish a wireless connection.

17. The electrical installation according to claim 1, wherein a control output of the at least one optical triggering device is connected electrically or by wire to a switching input of the protective switch.

18. The electrical installation according to claim 1, wherein the switchgear cabinet is configured for an operating current of at least 250 amperes and/or for an operating voltage of maximally 1000 VAC or 1500 VDC.

19. A method for securing an electrical installation which comprises a switchgear cabinet, a protective switch arranged in the switchgear cabinet, and at least one optical triggering device which is wirelessly operatively connected to the protective switch and triggers or switches off the protective switch upon optical detection of an arc, the method comprising:

triggering or switching off the protective switch by the at least one optical triggering device only when an access to a secured area of the electrical installation is detected by a detection device detecting a presence of the at least one optical triggering device in a danger area of the electrical installation, wherein:

the detection device is formed in the danger area of the electrical installation and an electronic circuit connected to the detection device is configured to allow, and otherwise prevent, a triggering or switching off of the protective switch by the at least one triggering device when the at least one optical triggering device is present in the danger area, and wherein the detection device comprises a wireless detection receiver or is connected to a wireless detection receiver and configured to detect the at least one optical triggering device as present in a danger area, when a transmit signal generated by the at least one optical triggering device causes a reception field strength in the detection receiver which lies above a field strength threshold value.

20. The method according to claim 19, wherein the protective switch is triggered or switched off by the at least one optical triggering device only when a measured operating current through the protective switch or the electrical installation exceeds an operating current threshold value and/or a time derivative of the measured operating current exceeds an increase threshold value.

* * * * *